(12) United States Patent
Jeong et al.

(10) Patent No.: US 11,983,331 B2
(45) Date of Patent: May 14, 2024

(54) PRESSURE MEASURING DEVICE USING TEXTILE SENSOR, AND INTERNET OF THINGS-BASED DEVICE CONTROL SYSTEM USING SAME

(71) Applicant: Jeonghan Uhm, Seongnam-si (KR)

(72) Inventors: Key Jeong, Suwon-si (KR); Seung Yo Kim, Seoul (KR)

(73) Assignee: Jeonghan Uhm, Seongnam-si (KR)

( * ) Notice: Subject to any disclaimer, the term of this patent is extended or adjusted under 35 U.S.C. 154(b) by 628 days.

(21) Appl. No.: 17/207,356

(22) Filed: Mar. 19, 2021

(65) Prior Publication Data

US 2021/0208691 A1 Jul. 8, 2021

Related U.S. Application Data

(63) Continuation of application No. PCT/KR2019/014099, filed on Oct. 24, 2019.

(30) Foreign Application Priority Data

Nov. 19, 2018 (KR) ........................ 10-2018-0142705

(51) Int. Cl.
*G06F 3/02* (2006.01)
*G06F 13/12* (2006.01)
(Continued)

(52) U.S. Cl.
CPC ............ *G06F 3/0202* (2013.01); *G06F 13/12* (2013.01); *G16Y 10/25* (2020.01); *G16Y 20/10* (2020.01)

(58) Field of Classification Search
CPC ...... G06F 3/0202; G06F 13/12; G06F 3/0219; G16Y 10/25; G16Y 20/10; D03D 1/00;
(Continued)

(56) References Cited

U.S. PATENT DOCUMENTS 7,365,031 B2 4/2008 Swallow et al.
2017/0325525 A1* 11/2017 Hyde .................. A61G 7/1051

FOREIGN PATENT DOCUMENTS

KR 10-2017-0003101 A 1/2017
KR 10-1816847 B1 1/2018
(Continued)

OTHER PUBLICATIONS

International Search Report issued in PCT/KR2019/014099; mailed Feb. 3, 2020.

*Primary Examiner* — Michael J Brown
(74) *Attorney, Agent, or Firm* — Studebaker & Brackett PC (57) ABSTRACT

The present disclosure relates to a pressure measuring device using a textile sensor. In one embodiment the pressure measuring device includes: a textile sensor which exhibits conductivity; a power unit which supplies power to the pressure measuring device; and a control unit which is electrically connected to a textile sensor layer and the power unit, checks a resistance change value detected by the textile sensor by a force applied to the textile sensor, and determines the pressure value of the force applied to the textile sensor on the basis of the checked resistance change value, wherein the control unit checks a control command corresponding to the pressure value measured on the basis of the force applied to the textile sensor, and may transmit the control command to a pre-designated peripheral device. A function corresponding to the checked control command may be executed on the pre-designated peripheral device.

6 Claims, 9 Drawing Sheets

(51) Int. Cl.
*G16Y 10/25* (2020.01)
*G16Y 20/10* (2020.01)
*D03D 1/00* (2006.01)
*G01L 1/22* (2006.01)
*G05B 13/02* (2006.01)

(58) Field of Classification Search
CPC ....... D03D 1/0088; G01L 1/22; G01L 1/2206; G05B 13/02
USPC .......................................................... 700/28
See application file for complete search history.

(56) References Cited

FOREIGN PATENT DOCUMENTS

| KR | 10-2018-0046495 A | 5/2018 |
| KR | 10-2018-0065161 A | 6/2018 |

* cited by examiner

PRESSURE MEASURING DEVICE USING TEXTILE SENSOR, AND INTERNET OF THINGS-BASED DEVICE CONTROL SYSTEM USING SAME

CROSS-REFERENCE TO RELATED APPLICATIONS

The present application is a continuation of International Patent Application No. PCT/KR2019/014099, filed on Oct. 24, 2019, which is based upon and claims the benefit of priority to Korean Patent Application No. 10-2018-0142705 filed on Nov. 19, 2018. The disclosures of the above-listed applications are hereby incorporated by reference herein in their entirety.

BACKGROUND

Embodiments of the inventive concept described herein relate to a device for measuring pressure by using a textile sensor and a system for controlling a device based on Internet of Thing (IoT), and more particularly, relate to a device and a system for controlling a peripheral device, capable of measuring pressure by using a textile sensor in a daily life and of controlling a peripheral device based on measured pressure.

Recently, there has been developed a technology in which a textile sensor is inserted into a product such, as clothing, a cushion, a footrest, a sofa, or a bed, which is used in daily life, to measure pressure applied to the product, and to sense and analyze various types of information, based on the measured pressure.

However, since products used in daily life have various structures, pressure applied to the products may not be precisely sensed by using the textile sensor.

In addition, recently, although a technology based on an Internet of Thing (IoT) has gradually become important, a conventional technology is focused only on analyzing information sensed by using the textile sensor. Accordingly, the information sensed by using the textile sensor needs to be increasingly utilized for a technology based on the IoT.

SUMMARY

Embodiments of the inventive concept provide a device for measuring pressure, which includes a plurality of layers, which makes contact with each other when pressure is applied, to enhance the precision in measuring the pressure and the installation of a product.

Embodiments of the inventive concept provide a device for measuring pressure, which compares candidate coordinates and a resistance variation value of a position in which the pressure is detected, to precisely measure the position in which the pressure is detected.

In addition, embodiments of the inventive concept provide a system for controlling a device based on the Internet of thing, capable of transmitting, to a peripheral device, a control command corresponding to a pressure value detected from a device for measuring pressure, such that a user may simply control a peripheral device by using a product used in a daily life.

The objects of the inventive concept are not limited to the above, but other effects, which are not mentioned, will be apparently understood to those skilled in the art.

According to an embodiment, a device for measuring pressure by using a textile sensor, may include the textile sensor having conductivity, a power supply unit to supply power to the device for measuring the pressure, and a control unit electrically connected with a layer of the textile sensor and the power supply unit, to determine a resistance variation sensed in the textile sensor through force applied to the textile sensor, and to determine a pressure value of the force applied to the textile sensor, based on the determined resistance variation. The control unit may determine a control command corresponding to the pressure value measured based on the force applied to the textile sensor, and transmit the determined control command to a peripheral device, which is specified in advance, such that the peripheral device, which is specified in advance, executes a function corresponding to the determined control command.

According to an embodiment, a system for controlling a device, based on an Internet of Thing (IoT), may include a pressure measuring device included in a product making contact with a user, and at least one peripheral device connected with the pressure measuring device. The pressure measuring device may include a textile sensor having conductivity, a power supply unit to supply power to the pressure measuring device, and a control unit electrically connected with a layer of the textile sensor and the power supply unit, to determine a resistance variation sensed in the textile sensor through force applied to the textile sensor, and to determine a pressure value of the force applied to the textile sensor, based on the determined resistance variation. The control unit may determine a control command corresponding to the pressure value measured based on the force applied to the textile sensor, and transmit the determined control command to the at least one peripheral device. The at least one peripheral device may receive the determined control command and execute a function corresponding to the received control command.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, an exemplary embodiment of the inventive concept will be described with reference to accompanying drawings. Advantage points and features of the inventive concept and a method of accomplishing the same will become apparent from the following description with reference to the following drawings, wherein embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. The inventive concept may be defined by scope of the claims. Like reference numerals refer to like elements throughout the whole specification.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is provided for explaining embodiments, but the inventive concept is not limited thereto. As used herein, the singular terms "a", "an" , and "the" are intended to include the plural forms as well, unless the context clearly indicates otherwise. Furthermore, it will be further understood that the terms "comprises", "comprising," "includes" and/or "including", when used herein, specify the presence of stated components, but do not preclude the presence or addition of one or more other components.

Figure 1:
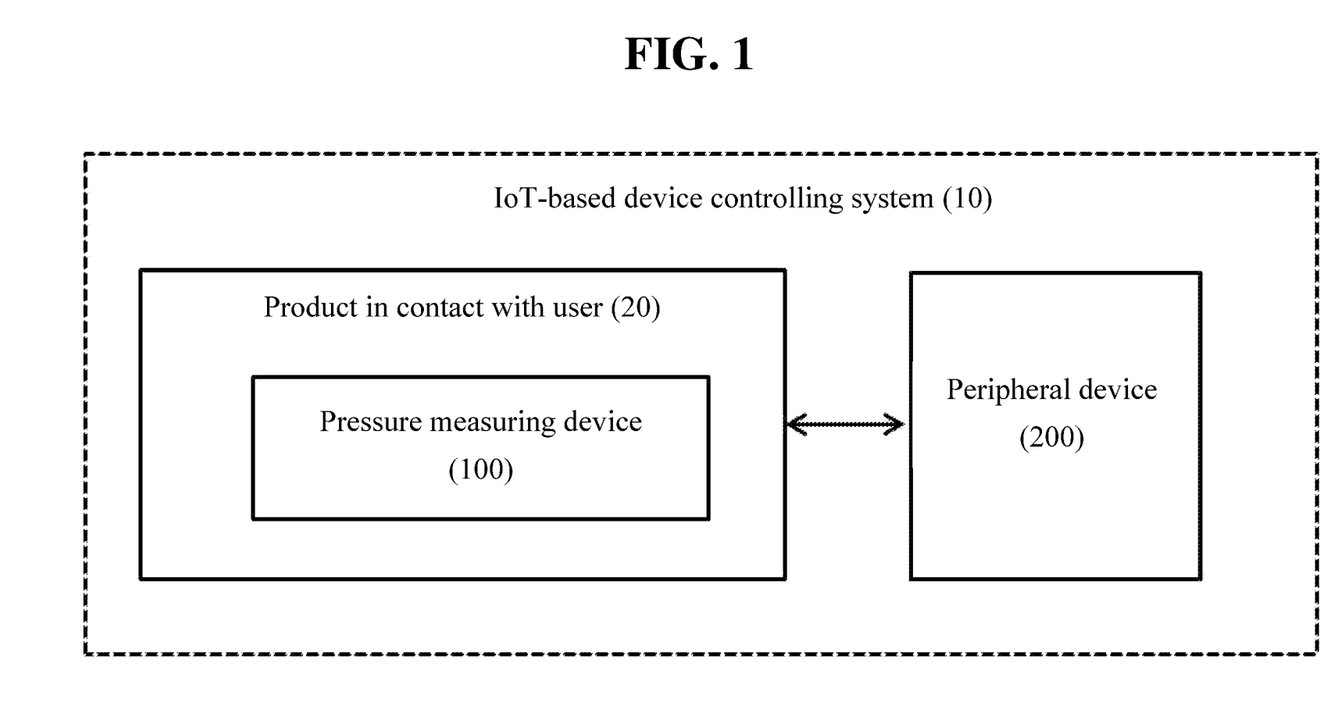
FIG. 1 is a block diagram illustrating a system for controlling a device, based on an IoT by using a device for measuring pressure, according to an embodiment of the inventive concept.

FIG. 1 is a block diagram illustrating a system for controlling a device, based on an IoT by using a device for measuring pressure, according to an embodiment of the inventive concept.

Referring to FIG. 1, according to an embodiment of the inventive concept, a system (device controlling system) 10 for controlling a device based on an IoT may include a device (pressure measuring device) 100 for measuring pressure and a peripheral device 200. The system (device controlling system) 10 for controlling the device based on the IoT may transmit a control command to the peripheral device 200, based on a pressure value obtained by the pressure measuring device 100 and may execute a function corresponding to the control command in the peripheral device 200.

According to an embodiment, the pressure measuring device 100 and the peripheral device 200 may make communication with each other through a network. In this case, the network may include a wireless network or a wired network. For example, the network may include a short-range communication network (e.g., Bluetooth, WiFi direct, or infrared data association (IrDA)) or a telecommunication network (e.g., a cellular network, the Internet, or a computer network (e.g., LAN or WAN)).

According to an embodiment, the pressure measuring device 100 is included in a product 20 which a user accesses or is connected with the product 20 to measure the value of pressure applied to the pressure measuring device 100. In this case, a product making contact with the user may refer to a product which the user uses in daily life by making contact with at least a portion of the product. For example, the product may include clothing, a cushion, a footstool, a sofa, or a bed, but the inventive concept is not limited thereto. The pressure measuring device 100 may be configured together with a fabric to be embedded in a product in a process of producing the product, or may be attached to the product after the product is produced.

According to an embodiment, the peripheral device 200 may include at least one of a TV, a speaker, a home security device, an air conditioner, a boiler, a smartphone, a tablet personal computer (PC), a mobile phone, a video phone, and an e-book reader, a desktop PC, laptop PC, a netbook computer, a workstation, a server, a personal digital assistant (PDA), a portable multimedia player (PMP), an MP3 player, a mobile medical device, a camera, or a wearable device.

Figure 2:
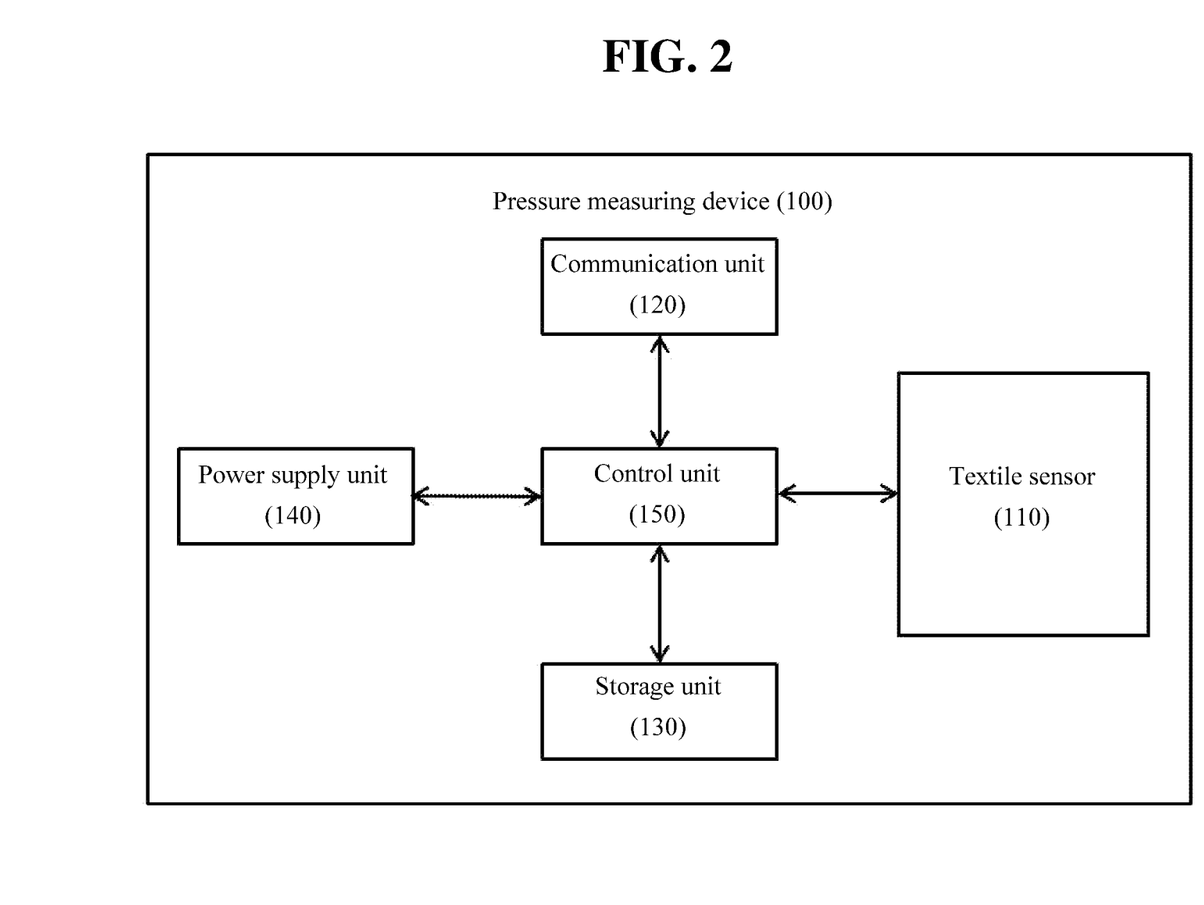
FIG. 2 is a block diagram illustrating a device for measuring pressure, according to an embodiment of the inventive concept.
Figure 3:
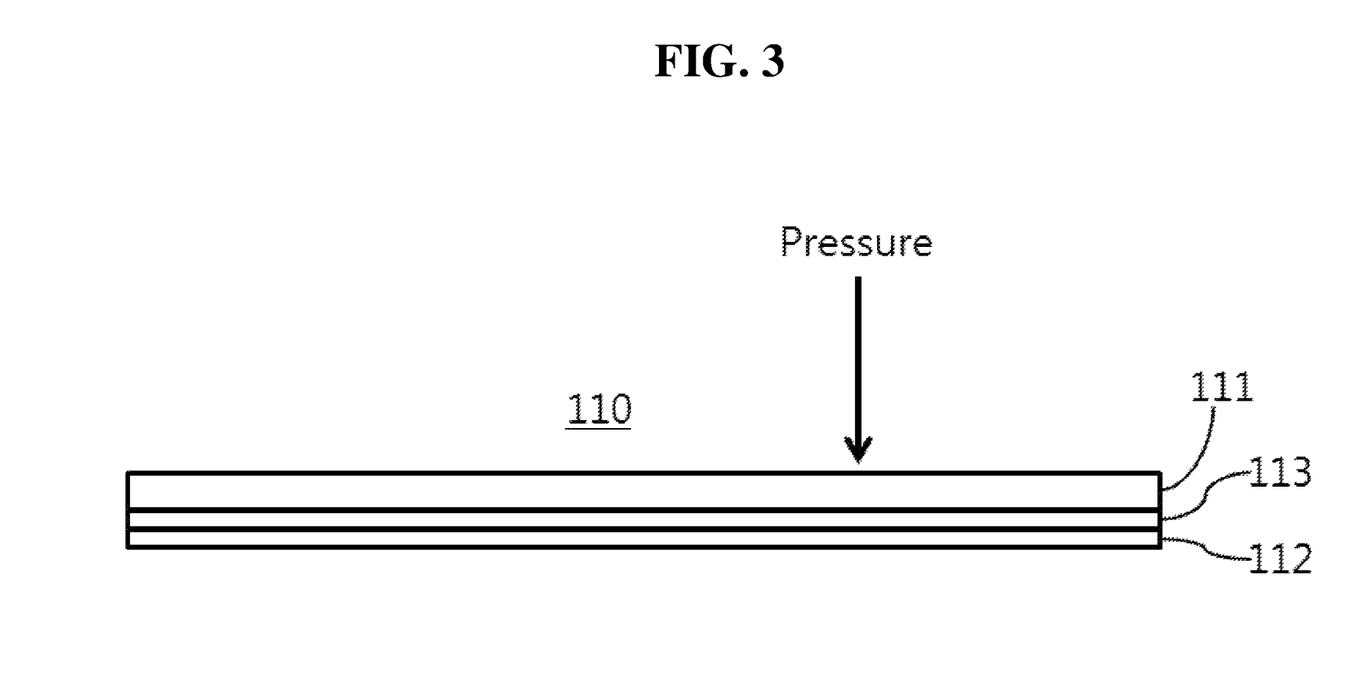
FIG. 3 is a sectional view illustrating a textile sensor, according to an embodiment of the inventive concept.

FIG. 2 is a block diagram illustrating a pressure measuring device, according to an embodiment of the inventive concept. FIG. 3 is a sectional view illustrating a textile sensor, according to an embodiment of the inventive concept. A textile sensor (or a textile strain sensor) 110 to be described with reference to FIG. 3 is a textile sensor in which a first layer 112 and a second layer 113 are implemented in the form of individual layers, respectively.

Referring to FIGS. 2 and 3, the pressure measuring device 100 may include the textile sensor 110, a communication unit 120, a storage unit 130, a power supply unit 140, and a control unit 150.

Figure 4A:
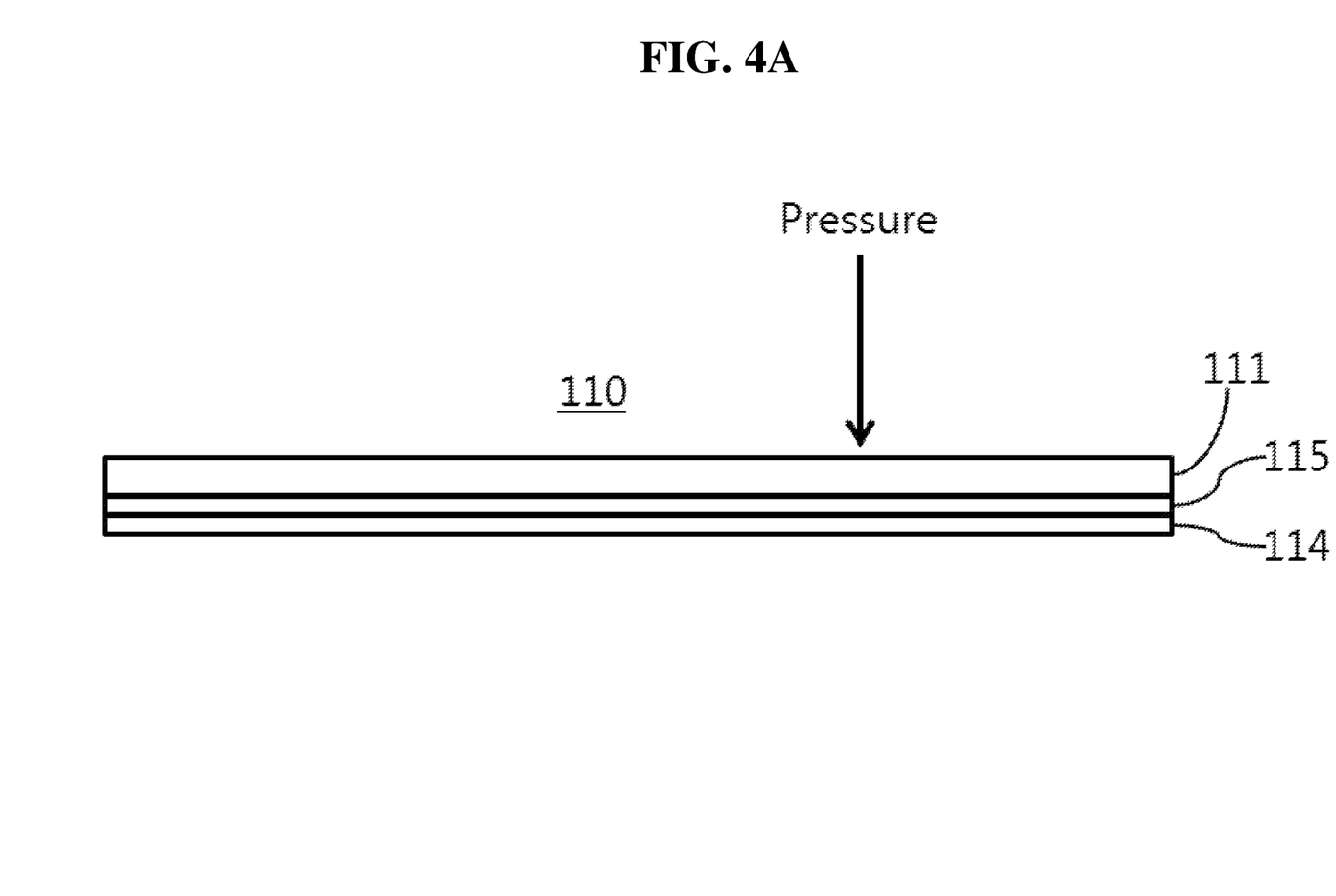
FIGS. 4A to 4C are views illustrating a textile sensor, according to another embodiment of the inventive concept.
Figure 4B:
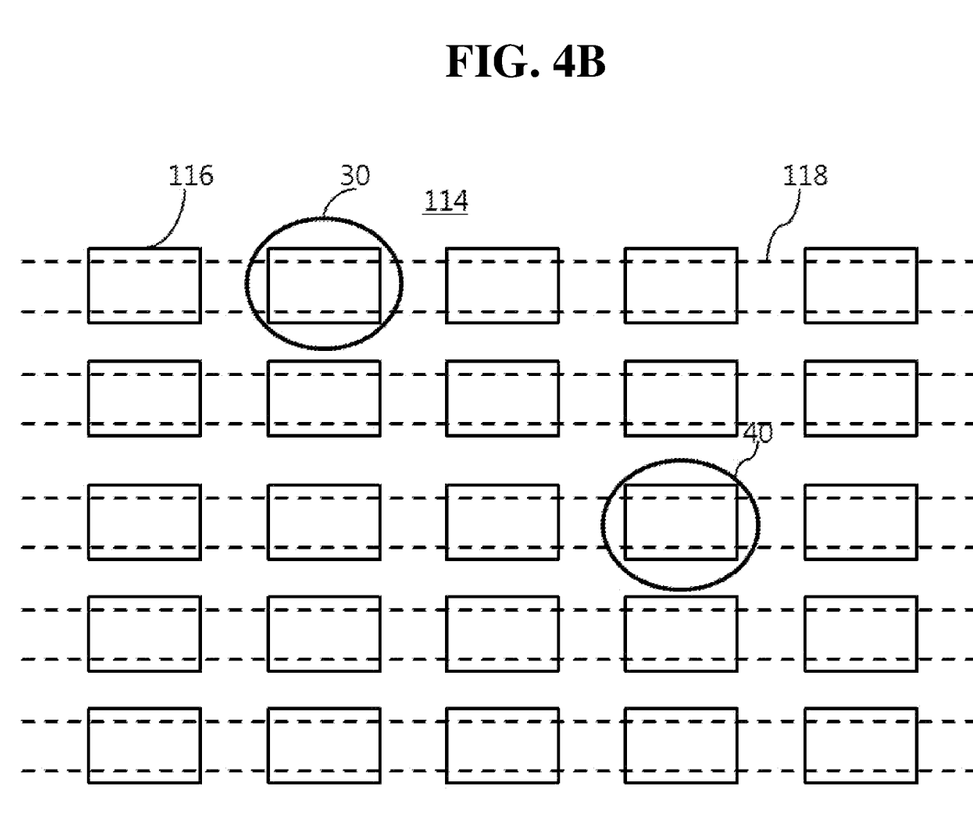
Figure 4C:
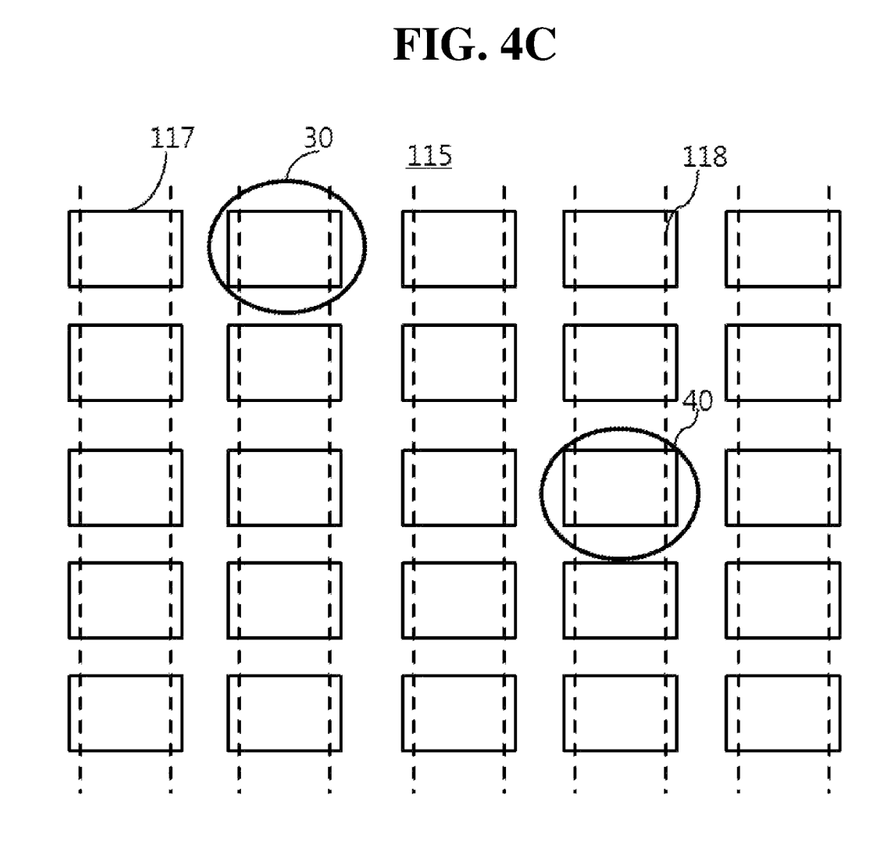

The textile sensor 110, which is a component to measure, as a numeric value, pressure applied to the pressure measuring device 100 or the textile sensor 110, may be implemented by coating an elastic material 111 on the first layer 112 and the second layer 113 having conductivity, as illustrated in FIG. 3. Alternatively, the textile sensor 110 may be implemented by coating the elastic material 111 on a first sub-layer 114 and a second sub-layer 115 having connectivity as illustrated in FIGS. 4A to 4C.

According to various embodiments, the textile sensor (or the textile strain sensor) 110 may be a sensor configured using a piezoresistive effect. Specifically, strain refers to the ratio of the length which is increased or decreased, to an original length, when a certain object is stretched or contracted. The textile sensor is a sensor of employing an electric-resistance variation for length deformation. This sensor is referred to as a piezoresistive sensor or a strain gauge. Generally, the strain gauge is a sensor to detect, as an electrical signal, a fine mechanical variation made when force is applied from the outside. When the strain gauge is attached to the surface of machine or a structure, the stain gauge may measure a fine variation in dimension made on the surface of the machine or the structure, and may monitor the damage to a mechanical structure based on the variation. In general, the strain sensor for a metal material is increased in an original length (L) and decreased in a sectional area (A) by the external force, such that a resistance is increased. To the contrary, when the original length (L) of the stain sensor is decreased, the resistance is reduced. This phenomenon is called a "piezoresistive effect". The textile sensor is formed by applying the piezoresistive effect to a textile such that the degree of the deformed surface of a target to be worn is measured based on the resistance variation. However, depending on the structure of the textile sensor, the textile sensor may be stretched to increase a resistance, as external force is applied thereto, and may be contracted to decrease the resistance, as the external force is removed (which is called a "positive piezoresistive effect"). To the contrary, the textile sensor may be stretched to decrease the resistance, as the external force is applied thereto, and may be contracted to increase a resistance, as the external force is removed (which is called a "negative piezoresistive effect").

According to one embodiment, the following description will be made regarding the textile sensor 110 in the type of the negative piezoresistive effect, in which, when the textile sensor 110 is stretched, as external force is applied thereto, a resistance is reduced. Alternatively, the textile sensor 110 may be in the type of the positive piezoresistive effect.

According to various embodiments, the first layer 112 and the second layer 113 may be implemented with a conductive line or a conductive yarn through which a current flows consecutively, periodically, or at a random time point, as power is supplied. The conductive line or the conductive yarn may serve as a conductive electrode. The conductive line or the conductive yarn may be coupled to a specific type of fabric to form the first layer 112 and the second layer 113, and may include conductive metal, such as gold (Au), silver (Ag), copper (Cu), or nickel (Ni), but the inventive concept is not limited thereto.

According to various embodiments, the first layer 112 and the second layer 113 may be integrally formed, and may be divided and connected with each other, as the textile sensor 110 is folded. In addition, the first layer 112 and the second layer 113 may be individually formed and stacked.

The elastic material 111 may include a coating agent, such as silicon or polyurethane (PU), which may be stretched as the external pressure is applied, as illustrated in FIG. 3, and may be coated on the first layer 112 and the second layer 113 by a specific thickness. Although FIG. 3 or FIG. 4A illustrates that the elastic material 111 is coated on any one of the first layer 112 and the second layer 113, the elastic material 111 may be coated on opposite layers of the first layer 112 and the second layer 113.

After such a textile sensor 110 constitutes at least a portion of a product or is inserted into the product, when a user moves, changes the posture of the user, sits down or lies down on an external object, in the state the user wears the product, and when the product is pressed by a body of the user (e.g., when the product is a cushion and a person sits down on the cushion), force is applied in a normal direction to the textile sensor 110.

In this case, the textile sensor 110 may sense the resistance variation resulting from the force applied to the textile sensor 110 and the variation in the textile sensor 110 (e.g., the variation in the length of the textile sensor 110) when the textile sensor 110 is stretched or contracted. The textile sensor 110 may sense such a resistance variation by sensing the variation in current flowing through the textile sensor 110 or by additionally including a sensor to sense the resistance variation or the current. The resistance variation sensed by the textile sensor 110 may be provided to the control unit 150

The following description will be made in more detail regarding an operation of sensing the resistance variation in the textile sensor 110. The conductive line or the conductive yarn constituting the conductive electrode in the textile sensor 110 represents approximately infinite resistance in an ordinary time in which force is not applied. When force (tensile force/pressure) is applied from the outside, the resistance may be reduced depending force, and the decrement in resistance by the external force may be the resistance variation. The textile sensor 110 described herein may be in the type of the negative piezoresistive effect in which, when the textile sensor 110 is stretched, as the tensile force is applied thereto, the resistance is decreased, and when the textile sensor 110 is contracted, the resistance is increased.

According to an embodiment, the textile sensor 110 may be implemented with a plurality of layers (the first layer 112 and the second layer 113) including a conductive line or a conductive yarn, as illustrated in FIG. 3. For example, when force is applied to the textile sensor 110 from the outside, the first layer 112 and the second layer 113 may be pressed by the pressure, and the sectional area, through which current flows, may be more increased when compared with that of a single layer, as the first layer 112 and the second layer 113 mutually make contact with each other by the pressure. Accordingly, the resistance variation may be more increased when compared to the single layer. In other words, when layers including a conductive line or a conductive yarn are disposed in plural, the sensitivity for sensing the resistance may be more increased when compared to that of the single layer.

Although not illustrated, according to various embodiments, in the textile sensor 110, the elastic material (e.g., the first coating layer) coated on one surface of the first layer 112 and the second layer 113 may have a thickness different from that of an elastic material (e.g., the second coating layer) coated on an opposite surface of the first layer 112 and the second layer 113. Accordingly, when a product including the textile sensor 110 is pressed by a user, the pressure measuring device 100 may distinguish between pressure applied from the side of a body of the user and pressure applied from the outside.

Meanwhile, the textile sensor 110 described with reference to FIG. 3 is a textile sensor including the first layer 112 and the second layer 113 implemented at individual layers. The first layer 112 and the second layer 113 of FIG. 3 may have the form in which a plurality of sub-textile sensors are arranged in a parallel electrical connection manner as illustrated in FIGS. 4B and 4C. For example, a plurality of sub-textile sensors disposed in the first layer 112 and a plurality of sub-textile sensors disposed in the second layer 113 may make contact with each other when force is applied to the textile sensor 110, and the control unit 150 may determine the resistance variations sensed by the plurality of sub-textile sensors in the first layer 112 and the plurality of sub-textile sensors in the second layer 113, as the plurality of sub-textile sensors in the first layer 112 and the plurality of sub-textile sensors in the second layer 113 make contact with each other by the force applied to the textile sensor 110. In addition, as illustrated in FIG. 3, the first layer 112 and the second layer 113 may be implemented in the structure of FIG. 4B or the structure of FIG. 4C, or may be identically implemented in one of the structures of FIG. 4B and FIG. 4C.

Referring to back FIG. 2, the communication unit 120 may establish communication connection between the pressure measuring device 100 and the peripheral device 200. For example, the communication unit 120 may be connected with the network through wireless communication or wired communication to make communication with the peripheral device 200.

The storage unit 130 may temporarily or permanently store information generated or collected by the textile sensor 110 or the control unit 150. The storage unit 130 may be implemented with a memory or a buffer.

The power supply unit 140 performs a function of supplying power to the pressure measuring device 100. The power supply unit 140 may be implemented in a substantially small size or an ultra-small size, and may be electrically connected with components of the pressure measuring device 100. Such a power supply unit 140 may be implemented with a battery having a limited capacity or a battery charged with power through power supply.

The control unit 150 may determine the changed resistance variation and the changed pressure value, based on information collected through the textile sensor 110, and may transmit a control command, which corresponds to the pressure value, to the peripheral device 200 through the communication unit 120.

FIGS. 4A to 4C are views illustrating a textile sensor, according to another embodiment of the inventive concept.

Referring to FIGS. 4A to 4C, the textile sensor 110 may be implemented with not only a single textile sensor (the first layer 112 and the second layer 113 in FIG. 3), but also a textile sensor (the first sub-layer 114 and the second sub-layer 115 of FIG. 4A) including a plurality of sub-textile sensors (or the textile sensors). The plurality of sub-textile sensors may form a parallel electrical connection structure, and may be connected with each other through a conductive line, a conductive yarn, or a silver yarn 118. For example, the textile sensor 110 may be finely divided into several parts (in the size of about 3 cm) and may be connected with each other through a silver yarn or a wire. In other words, the sensor extending longitudinally in a horizontal direction is individually formed with a short length and connected in parallel to reduce resistance. However, such a form is provided for the illustrative purpose, but the form of a plurality of the textile sensors is not limited to the forms illustrated in FIGS. 4B to 4C

According to an embodiment, as illustrated in FIG. 4B, the first sub-layer 114 may include a plurality of first sub-textile sensors 116 arranged in parallel in a first direction to sense an X value of coordinates corresponding to a position in which the pressure is detected. In this case, the first direction may be the horizontal direction. For example, five sub-textile sensors 116 are disposed on each horizontal line, and five horizontal lines are disposed in total, but the inventive concept is not limited thereto.

According to an embodiment, as illustrated in FIG. 4C, the second sub-layer 115 may include a plurality of second sub-textile sensors 117 arranged in parallel in a second direction crossing the first direction to sense an Y value of coordinates corresponding to the position in which the pressure is detected. In this case, the second direction may be a vertical direction. For example, five sub-textile sensors 117 are disposed in each vertical line, and five vertical lines are disposed in total, but the inventive concept is not limited thereto.

Figure 5:
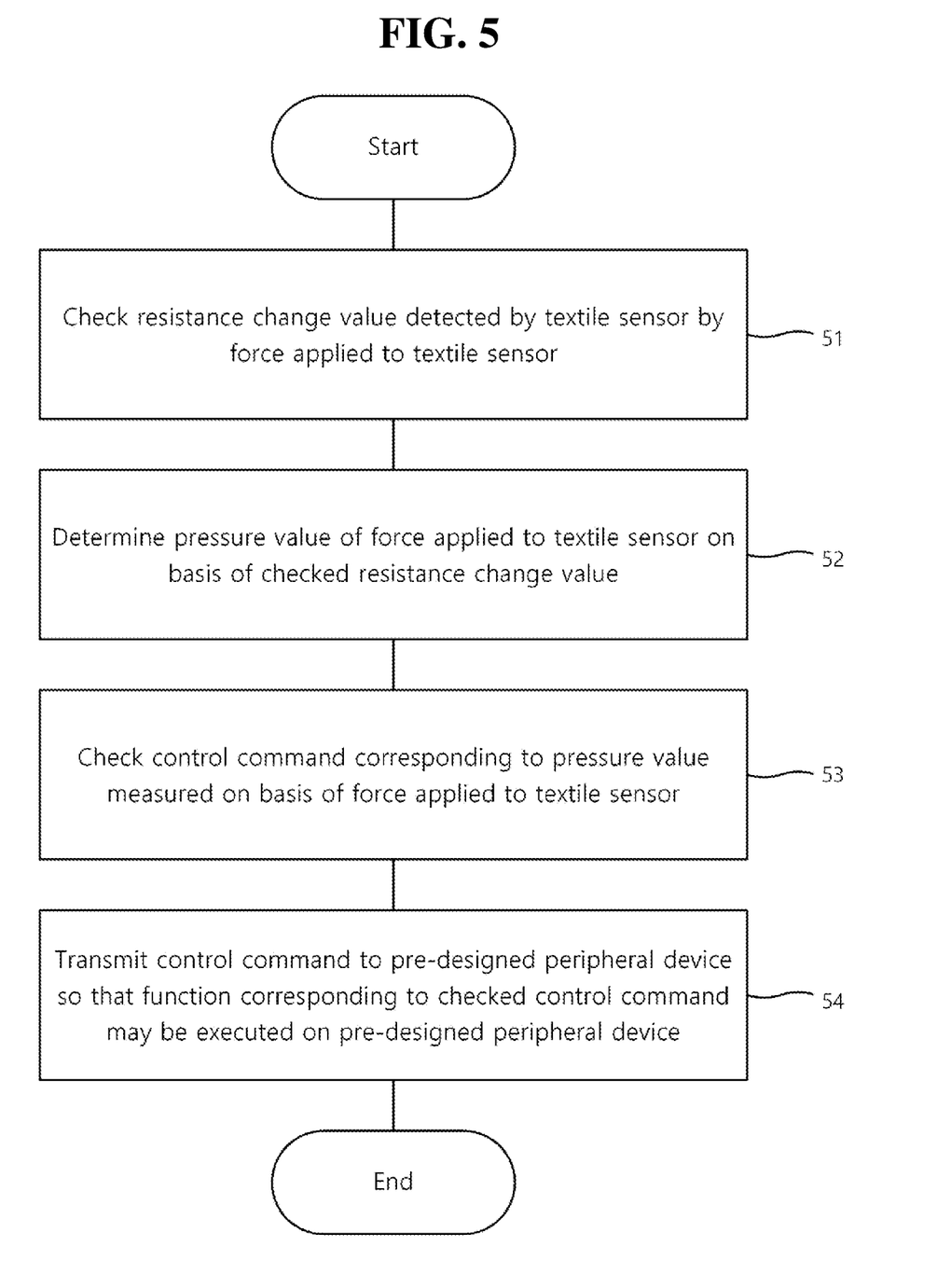
FIG. 5 is a flowchart illustrating a method for measuring pressure and a method for controlling a peripheral device, according to an embodiment of the inventive concept.

FIG. 5 is a flowchart illustrating a method for measuring pressure and a method for controlling a peripheral device, according to an embodiment of the inventive concept. Operations in FIG. 5 may be performed by the pressure measuring device 100 illustrated in FIG. 1 to FIG. 4C.

Referring to FIG. 5, according to an embodiment, in operation 51, the pressure measuring device 100 may determine a resistance variation sensed by the textile sensor 110 through force applied to the textile sensor 110. For example, when a product including the pressure measuring device 100 is a footrest installed in front of a front door, the control unit 150 may receive, from the textile sensor 110, a resistance changed as the textile sensor 110 is pressed by the force applied to the footrest through a person, as illustrated in FIGS. 3 to 4A.

According to an embodiment, in operation 52, the pressure measuring device 100 may determine a pressure value of force applied to the textile sensor 110, based on the resistance variation, which is determined. For example, the control unit 150 may determine the pressure value corresponding to the resistance variation, through a table or an equation in which pressure values are matched to resistance variations in advance.

According to an embodiment, in operation 53, the pressure measuring device 100 may determine a control command corresponding to the pressure value measured based on the force applied to the textile sensor 110. For example, the control unit 150 may store a table in which control commands corresponding to pressure values are stored. When a pressure value in a specific range is determined, the control command corresponding to the specific range may be determine. For example, when the range of the pressure value is 10 to 15, the control command for powering on a boiler may be matched. When the measured pressure value is 13, the control unit 150 may determine the control command for powering on the boiler.

According to an embodiment, in operation 54, the pressure measuring device 100 may transmit the control command to the peripheral device, which is specified in advance, such that a function corresponding to the determined control command is executed in the peripheral device 200 which is specified in advance. For example, when the determined control command is to power on the boiler, the control unit 150 may transmit the control command for powering on the boiler through the communication unit 120. As described above, the case, in which the product 20 making contact with a user is a footrest and the peripheral device 200 is a boiler device is provided only for the illustrative purpose, various modifications may be provided. For example, when the peripheral device 200 may be a device that controls a security system, and when pressure is sensed at the footrest at a specific time (dawn), the pressure measuring device 100 may transmit a signal for notifying intrusion to the security system.

Figure 6:
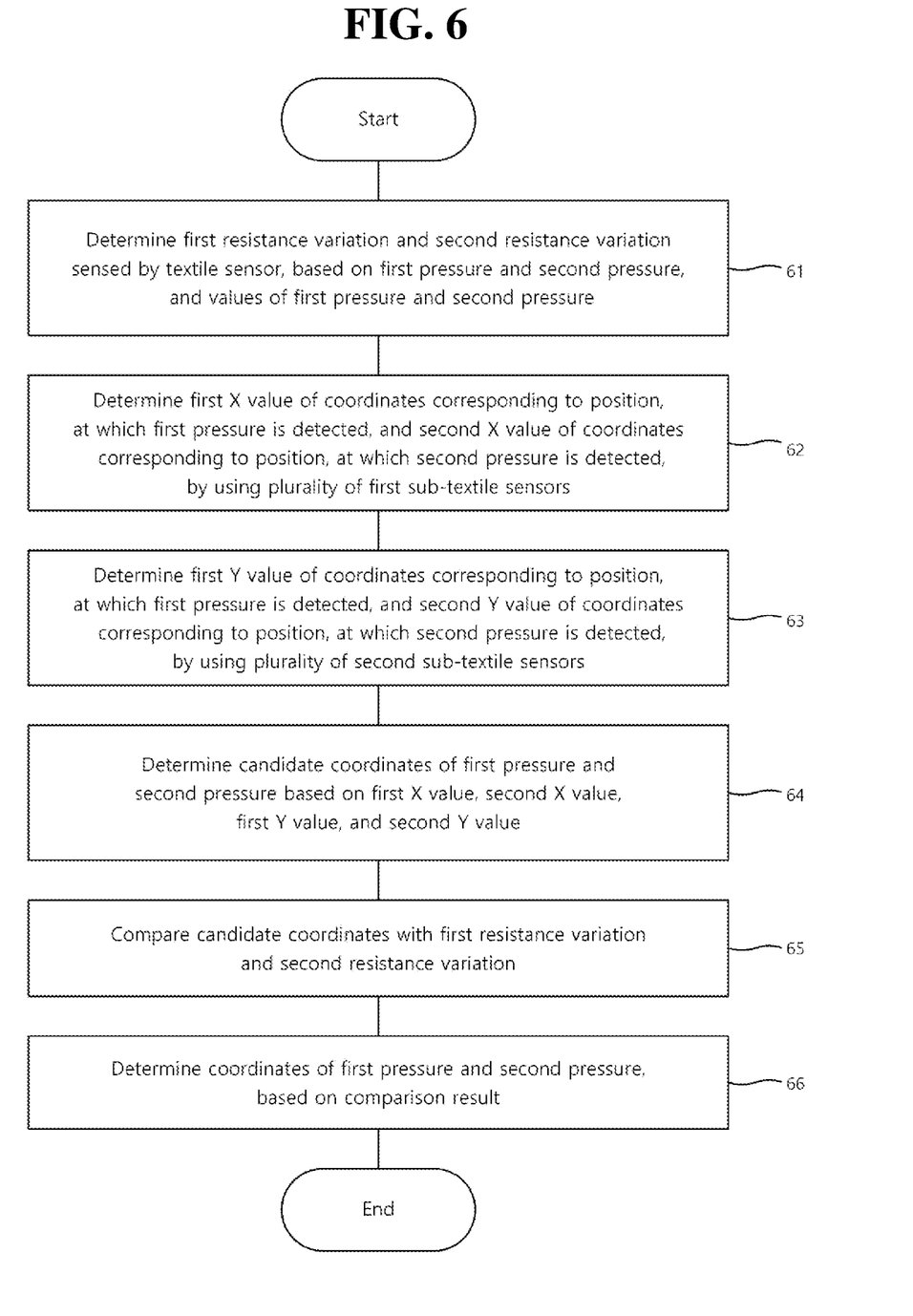
FIG. 6 is a flowchart illustrating a method for determining coordinates of pressure, according to an embodiment of the inventive concept.

FIG. 6 is a flowchart illustrating a method for determining coordinates of pressure, according to an embodiment of the inventive concept. Operations in FIG. 6 may be performed by the pressure measuring device 100 illustrated in FIG. 1 to FIG. 4C.

Referring to FIGS. 4B, 4C, and 6, according to an embodiment, in operation 61, the pressure measuring device 100 may determine a first resistance variation and a second resistance variation, which are sensed by the textile sensor 110, based on first pressure 30 and second pressure 40 applied to the textile sensor 110 at mutually different positions, and may determine the value of the first pressure 30 and the value of the second pressure 40 applied to the textile sensor 110, based on the determined first resistance variation and the determined second resistance variation. For example, as illustrated in FIGS. 4B and 4C, the pressure measuring device 100 may determine at least two pressures 30 and 40.

According to an embodiment, the pressure measuring device 100, in operation 62, may determine a first X value of coordinates corresponding to the position, at which the first pressure 30 is detected, and a second X value of coordinates corresponding to a position, at which the second pressure 40 is detected, by using the plurality of first sub-textile sensors 116. For example, for the convenience of explanation, it is assumed that coordinates of the first pressure 30 are (a, b), and coordinates of the second pressure 40 are (c, d). Accordingly, the pressure measuring device 100 may determine values of 'a' and 'c'.

According to an embodiment, the pressure measuring device 100, in operation 63, may determine a first Y value of coordinates corresponding to the position, at which the first pressure 30 is detected, and a second Y value of coordinates corresponding to a position, at which the second pressure 40 is detected, by using the plurality of second sub-textile sensors 117. For example, the pressure measuring device 100 may identify values of 'b' and 'd'.

According to an embodiment, the pressure measuring device 100 may determine candidate coordinates of the first pressure 30 and the second pressure 40 based on the first X value, the second X value, the first Y value, and the second Y value, in operation 64. For example, the candidate coordinates may be (a, b), (a, d), (c, b), or (c, d).

According to an embodiment, the pressure measuring device 100 may compare the candidate coordinates with the first resistance variation and the second resistance variation, in operation 65. For example, the pressure measuring device 100 may determine a position, at which a resistance is actually changed to be a reference value or more, as the sub-textile sensors which have detected the first pressure 30 and the second pressure 40 as illustrated in FIG. 4B, and FIG. 4C.

According to an embodiment, in operation 66, the pressure measuring device 100 may determine coordinates of the first pressure 30 and coordinates of the second pressure 40, based on the comparison result. For example, since positions, at which the first pressure 30 and the second pressure 40 are actually generated, are (a, b) and (c, d), the pressure measuring device 100 may exclude the coordinates (a, d) and (c, b) from candidate coordinates, and may determine coordinates (a, b) and (c, d) as the coordinates of the first pressure 30 and the second pressure 40.

In other words, according to the inventive concept, the pressure measuring device 100 may more precisely determine the position at which pressure is generated, by comparing candidate coordinates, at which pressure is determined as being generated, with the resistance variations.

Meanwhile, although FIG. 6 illustrates that operation 62 and operation 63 are sequentially performed, operation 62 and operation 63 may be simultaneously performed or reversely performed.

Figure 7:
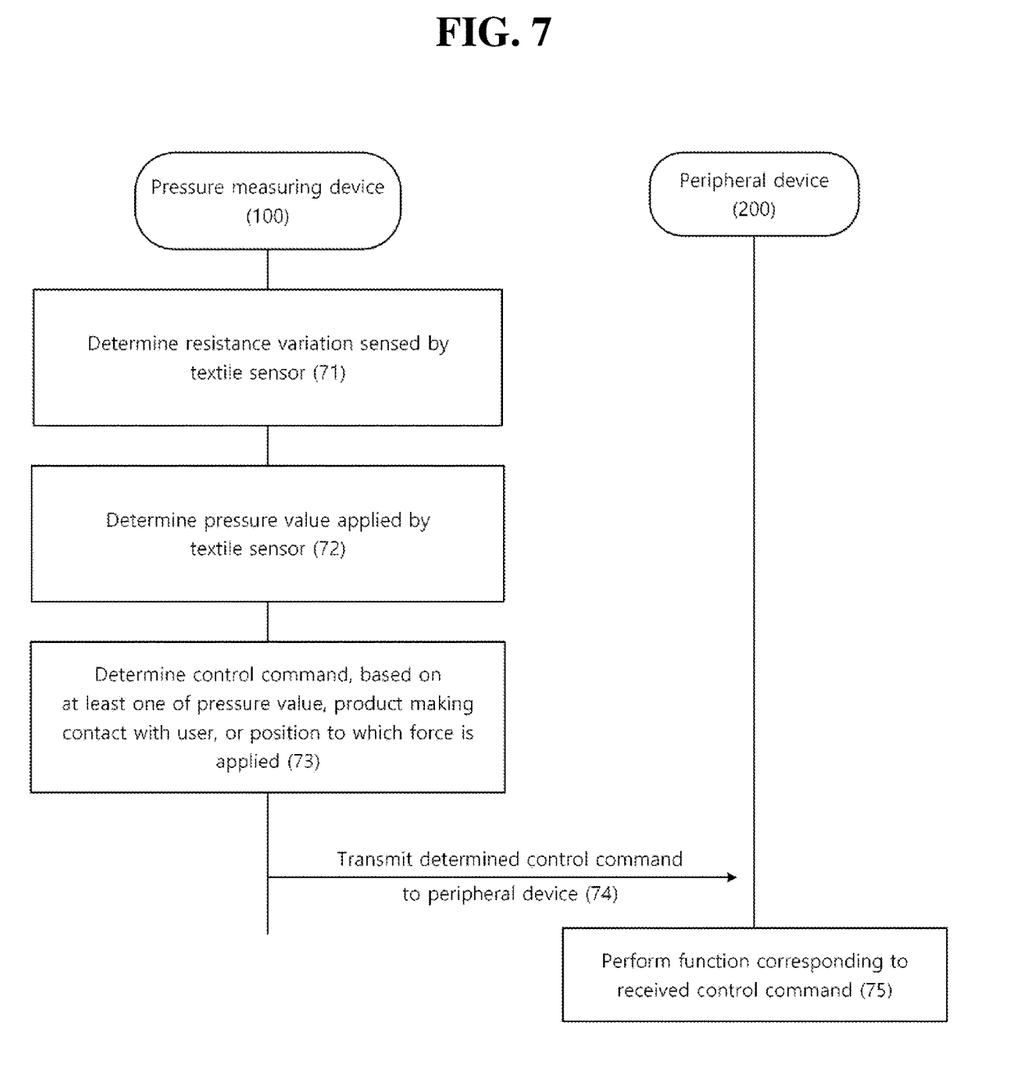
FIG. 7 is a flowchart illustrating a system for controlling a device, based on an IoT by using a device for measuring pressure, according to an embodiment of the inventive concept.

FIG. 7 is a flowchart illustrating a system for controlling a device, based on an IoT by using a device for measuring pressure, according to an embodiment of the inventive concept. Operations in FIG. 7 may be performed by the pressure measuring device 100 disclosed in FIG. 1 to FIG. 4C. Meanwhile, the duplication of the description of the above operations will be omitted for the convenience of explanation.

Referring to FIG. 7, according to an embodiment, the pressure measuring device 100 may determine the resistance variation sensed by the textile sensor 110 in operation 71, and may determine a pressure value applied to the textile sensor 110 in operation 72.

According to an embodiment, the pressure measuring device 100 may determine a control command, based on at least one of the pressure value, the product 20 making contact with the user, or a position to which force is applied, in operation 73. For example, the pressure measuring device 100 may determine a control command for powering on a TV of the peripheral devices 200, when the product 20, with which a user makes contact, is a cushion and when the measured pressure value corresponds to the weight of the user. In addition, the pressure measuring device 100 transmits an intrusion detection signal to a device for controlling a security system of the peripheral devices 200, when the product 20, with which the user makes contact, is a footrest and when the measured pressure value does not correspond to the weight of the user. In addition, the pressure measuring device 100 may determine a control command for powering off a lighting device of the peripheral devices 200, when the product 20, with which a user makes contact, is a bed and when the measured pressure value corresponds to the weight of the user. In addition, the pressure measuring device 100 may determine a control command for powering on a boiler device of the peripheral devices 200, when the product 20, with which a user makes contact, is a sofa and when the measured pressure value corresponds to the weight of the user. The above embodiments are provided only for the illustrative purpose, and various embodiments to control all peripheral devices 200 belonging to a daily life environment and a business environment of a user may be applied.

In addition, according to various embodiments, the control command may be determined based on coordinates corresponding to the position at which force is applied. For example, when the pressure measuring device 100 is included in the entire portion of a bed sheet, and when pressure is detected from a left side of the bed sheet, a control command for powering off the lighting device may be determined. When pressure is detected from a right side of the bed sheet, a control command for changing the lighting to a night-light may be determined. In other words, according to the inventive concept, the pressure measuring device 100 may determine a control command to be transmitted to the peripheral device 200, by integrally considering coordinates corresponding to a position at which force is applied and a product with which a user makes contact.

According to an embodiment, the pressure measuring device 100 may transmit the determined control command to the peripheral device 200 in operation 74, and may perform a function corresponding to the received control command in operation 75. For example, the function may include a function of powering on the TV or of powering off the lighting device.

According to an embodiment of the inventive concept, a device for measuring pressure, may include a textile strain sensor having conductivity, a power supply unit to supply power to the device for measuring the pressure, and a control unit electrically connected with a layer of the textile sensor and the power supply unit, to determine a resistance variation sensed in the textile sensor through force applied to the textile sensor, and to determine a pressure value of the force applied to the textile sensor, based on the determined resistance variation. The control unit may determine a control command corresponding to the pressure value measured based on the force applied to the textile sensor, and transmit the determined control command to a peripheral device, which is specified in advance, such that the peripheral device, which is specified in advance, executes a function corresponding to the determined control command.

According to various embodiments, the textile sensor may include a first layer and a second layer, each of the first layer and the second layer may include a plurality of sub-textile sensors connected with each other in a parallel electrical connection manner, the plurality of sub-textile sensors disposed in the first layer may make contact with the plurality of sub-textile sensors disposed in the second layer, when the force is applied to the textile sensor, and the control unit may determine the resistance variation sensed in the plurality of sub-textile sensors in the first layer and the plurality of sub-textile sensors in the second layer, which make contact with each other through the force applied to the textile sensor.

According to various embodiments, the first layer and the second layer may be divided and connected with each other, as the textile sensor is folded.

According to various embodiments, the textile sensor may include a first sub-layer including a plurality of first sub-textile sensors arranged in parallel in a first direction to sense an X value of coordinates corresponding to a position in which the pressure is detected, and a second sub-layer including a plurality of second sub-textile sensors arranged in parallel in a second direction crossing the first direction to sense a Y value of the coordinates corresponding to the position in which the pressure is detected.

According to various embodiments, the control unit may determine a first resistance variation and a second resistance variation, which are sensed by the textile sensor, based on first pressure and second pressure applied to the textile sensor at mutually different positions, determine a value of the first pressure and a value of the second pressure, which are applied to the textile sensor, based on the determined first resistance variation and the determined second resistance variation, determine a first X value of coordinates corresponding to a position, at which the first pressure is detected, and a second X value of coordinates corresponding to a position, at which the second pressure is detected, by using the plurality of first sub-textile sensors, determine a first Y value of the coordinates corresponding to the position, at which the first pressure is detected, and a second Y value of the coordinates corresponding to the position, at which the second pressure is detected, by using the plurality of second sub-textile sensors, determine candidate coordinates of the first pressure and the second pressure based on the first X value, the second X value, the first Y value, and the second Y value, compare the candidate coordinates with the first resistance variation and the second resistance variation, and determine coordinates of the first pressure and coordinates of the second pressure, based on the comparison result.

According to an embodiment of the inventive concept, a system for controlling a device, based on an Internet of Thing (IoT), may include a pressure measuring device included in a product making contact with a user, and at least one peripheral device connected with the pressure measuring device. The pressure measuring device may include a textile sensor having conductivity, a power supply unit to supply power to the pressure measuring device, and a control unit electrically connected with a layer of the textile sensor and the power supply unit, to determine a resistance variation sensed in the textile sensor through force applied to the textile sensor, and to determine a pressure value of the force applied to the textile sensor, based on the determined resistance variation. The control unit may determine a control command corresponding to the pressure value measured based on the force applied to the textile sensor, and transmit the determined control command to the at least one peripheral device, and the at least one peripheral device may receive the determined control command and execute a function corresponding to the received control command.

According to various embodiments, the control unit may determine the control command by additionally considering at least one of coordinates of a position to which the force is applied and the product making contact with the user.

According to various embodiments, the textile sensor may include a first layer and a second layer, each of the first layer and the second layer may include a plurality of sub-textile sensors connected with each other in a parallel electrical connection manner, the plurality of sub-textile sensors disposed in the first layer may make contact with the plurality of sub-textile sensors disposed in the second layer, when the force is applied to the textile sensor, and the control unit may determine the resistance variation sensed in the plurality of sub-textile sensors in the first layer and the plurality of sub-textile sensors in the second layer, which make contact with each other through the force applied to the textile sensor.

According to various embodiments, the textile sensor may include a first sub-layer including a plurality of first sub-textile sensors arranged in parallel in a first direction to sense an X value of coordinates corresponding to a position in which the pressure is detected, and a second sub-layer including a plurality of second sub-textile sensors arranged in parallel in a second direction crossing the first direction to sense a Y value of the coordinates corresponding to the position in which the pressure is detected.

According to various embodiments, the control unit may determine a first resistance variation and a second resistance variation, which are sensed by the textile sensor, based on first pressure and second pressure applied to the textile sensor at mutually different positions, determine a value of the first pressure and a value of the second pressure, which are applied to the textile sensor, based on the determined first resistance variation and the determined second resistance variation, determine a first X value of coordinates corresponding to a position, at which the first pressure is detected, and a second X value of coordinates corresponding to a position, at which the second pressure is detected, by using the plurality of first sub-textile sensors, determine a first Y value of the coordinates corresponding to the position, at which the first pressure is detected, and a second Y value of the coordinates corresponding to the position, at which the second pressure is detected, by using the plurality of second sub-textile sensors, determine candidate coordinates of the first pressure and the second pressure based on the first X value, the second X value, the first Y value, and the second Y value, compare the candidate coordinates with the first resistance variation and the second resistance variation, and determine coordinates of the first pressure and coordinates of the second pressure, based on the comparison result.

As described above, the inventive concept has various effects as follows.

First, the sensitivity of the device to pressure may be increased by allowing sub-textile sensors included in a plurality of layers to make contact with each other through the force applied to the textile sensor.

Second, the pressure position may be more precisely detected by comparing the candidate coordinates with the resistance variations corresponding to the positions of pressure, which is obtained using two sub-layers.

Third, the user convenience may be enhanced with respect to the peripheral device of a user, as the device for measuring the product is inserted into the product utilized by the user in the daily life.

Although the embodiment of the inventive concept have been described with reference to accompanying drawings, those skilled in the art should understand that various modifications are possible without departing from the technical scope of the inventive concept or without changing the technical sprite or the subject matter of the inventive concept. Therefore, those skilled in the art should understand that the technical embodiments are provided for the illustrative purpose in all aspects and the inventive concept is not limited thereto.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A device for measuring pressure, the device comprising:
   a textile strain sensor having conductivity;

a power supply unit configured to supply power to the device for measuring the pressure; and a control unit electrically connected with a layer of the textile sensor and the power supply unit, and configured to determine a resistance variation sensed in the textile sensor through force applied to the textile sensor, and determine a pressure value of the force applied to the textile sensor, based on the determined resistance variation, wherein the control unit is configured to:

determine a control command corresponding to the pressure value measured based on the force applied to the textile sensor; and transmit the determined control command to a peripheral device, which is specified in advance, such that the peripheral device, which is specified in advance, executes a function corresponding to the determined control command, wherein the textile sensor includes:

a first sub-layer including a plurality of first sub-textile sensors arranged in parallel in a first direction to sense an X value of coordinates corresponding to a position in which the pressure is detected; and a second sub-layer including a plurality of second sub-textile sensors arranged in parallel in a second direction crossing the first direction to sense a Y value of the coordinates corresponding to the position in which the pressure is detected, and wherein the control unit is configured to:

determine a first resistance variation and a second resistance variation, which are sensed by the textile sensor, based on first pressure and second pressure applied to the textile sensor at mutually different positions;

determine a value of the first pressure and a value of the second pressure, which are applied to the textile sensor, based on the determined first resistance variation and the determined second resistance variation;

determine a first X value of coordinates corresponding to a position, at which the first pressure is detected, and a second X value of coordinates corresponding to a position, at which the second pressure is detected, by using the plurality of first sub-textile sensors;

determine a first Y value of the coordinates corresponding to the position, at which the first pressure is detected, and a second Y value of the coordinates corresponding to the position, at which the second pressure is detected, by using the plurality of second sub-textile sensors;

determine candidate coordinates of the first pressure and the second pressure based on the first X value, the second X value, the first Y value, and the second Y value;

compare the candidate coordinates with the first resistance variation and the second resistance variation; and determine coordinates of the first pressure and coordinates of the second pressure, based on the comparison result.

2. The device of claim 1, wherein the textile sensor includes:

a first layer and a second layer, wherein each of the first layer and the second layer includes a plurality of sub-textile sensors connected with each other in a parallel electrical connection manner, wherein the plurality of sub-textile sensors disposed in the first layer make contact with the plurality of sub-textile sensors disposed in the second layer, when the force is applied to the textile sensor, and wherein the control unit is configured to:

determine the resistance variation sensed in the plurality of sub-textile sensors in the first layer and the plurality of sub-textile sensors in the second layer, which make contact with each other through the force applied to the textile sensor.

3. The device of claim 2, wherein the first layer and the second layer are divided and connected with each other, as the textile sensor is folded.

4. A system for controlling a device, based on Internet of Thing (IoT), the system comprising:

a pressure measuring device included in a product making contact with a user; and at least one peripheral device connected with the pressure measuring device, wherein the pressure measuring device includes:

a textile sensor having conductivity;

a power supply unit configured to supply power to the pressure measuring device; and a control unit electrically connected with a layer of the textile sensor and the power supply unit, and configured to determine a resistance variation sensed in the textile sensor through force applied to the textile sensor, and determine a pressure value of the force applied to the textile sensor, based on the determined resistance variation, wherein the control unit is configured to:

determine a control command corresponding to the pressure value measured based on the force applied to the textile sensor; and transmit the determined control command to the at least one peripheral device, and wherein the at least one peripheral device receives the determined control command and executes a function corresponding to the received control command, wherein the textile sensor includes:

a first sub-layer including a plurality of first sub-textile sensors arranged in parallel in a first direction to sense an X value of coordinates corresponding to a position in which the pressure is detected; and a second sub-layer including a plurality of second sub-textile sensors arranged in parallel in a second direction crossing the first direction to sense a Y value of the coordinates corresponding to the position in which the pressure is detected, and wherein the control unit is configured to:

determine a first resistance variation and a second resistance variation, which are sensed by the textile sensor, based on first pressure and second pressure applied to the textile sensor at mutually different positions;

determine a value of the first pressure and a value of the second pressure, which are applied to the textile sensor, based on the determined first resistance variation and the determined second resistance variation;

determine a first X value of coordinates corresponding to a position, at which the first pressure is detected, and a second X value of coordinates corresponding to a position, at which the second pressure is detected, by using the plurality of first sub-textile sensors;

determine a first Y value of the coordinates corresponding to the position, at which the first pressure is detected, and a second Y value of the coordinates corresponding to the position, at which the second pressure is detected, by using the plurality of second sub-textile sensors;

determine candidate coordinates of the first pressure and the second pressure based on the first X value, the second X value, the first Y value, and the second Y value;

compare the candidate coordinates with the first resistance variation and the second resistance variation; and determine coordinates of the first pressure and coordinates of the second pressure, based on the comparison result.

5. The system of claim 4, wherein the control unit is configured to:

determine the control command by additionally considering at least one of coordinates of a position to which the force is applied and the product making contact with the user.

6. The system of claim 4, wherein the textile sensor includes:

a first layer and a second layer, wherein each of the first layer and the second layer includes a plurality of sub-textile sensors connected with each other in a parallel electrical connection manner, wherein the plurality of sub-textile sensors disposed in the first layer make contact with the plurality of sub-textile sensors disposed in the second layer, when the force is applied to the textile sensor, and wherein the control unit is configured to:

determine the resistance variation sensed in the plurality of sub-textile sensors in the first layer and the plurality of sub-textile sensors in the second layer, which make contact with each other through the force applied to the textile sensor.

* * * * *